No. 749,923. Patented January 19, 1904.

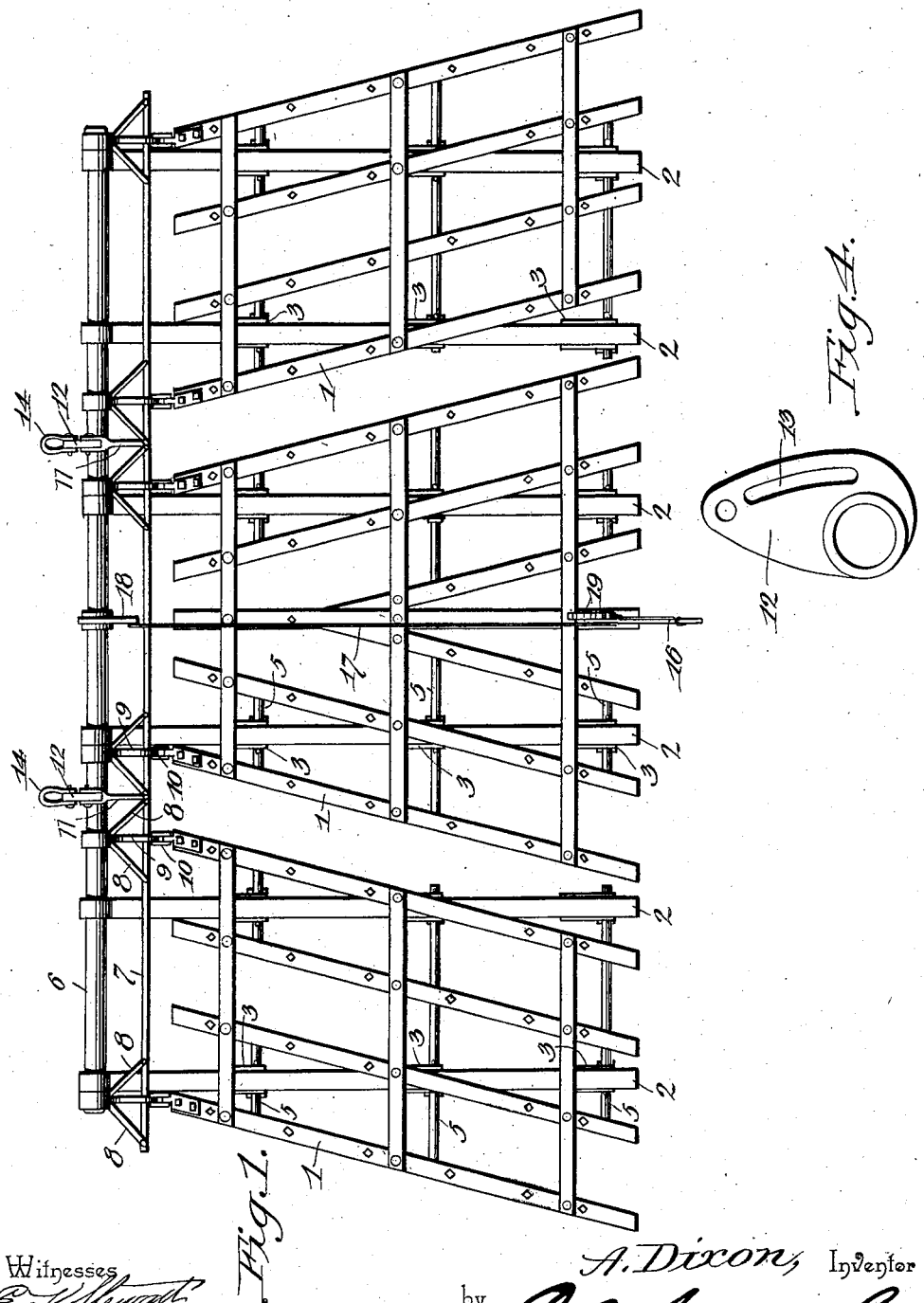

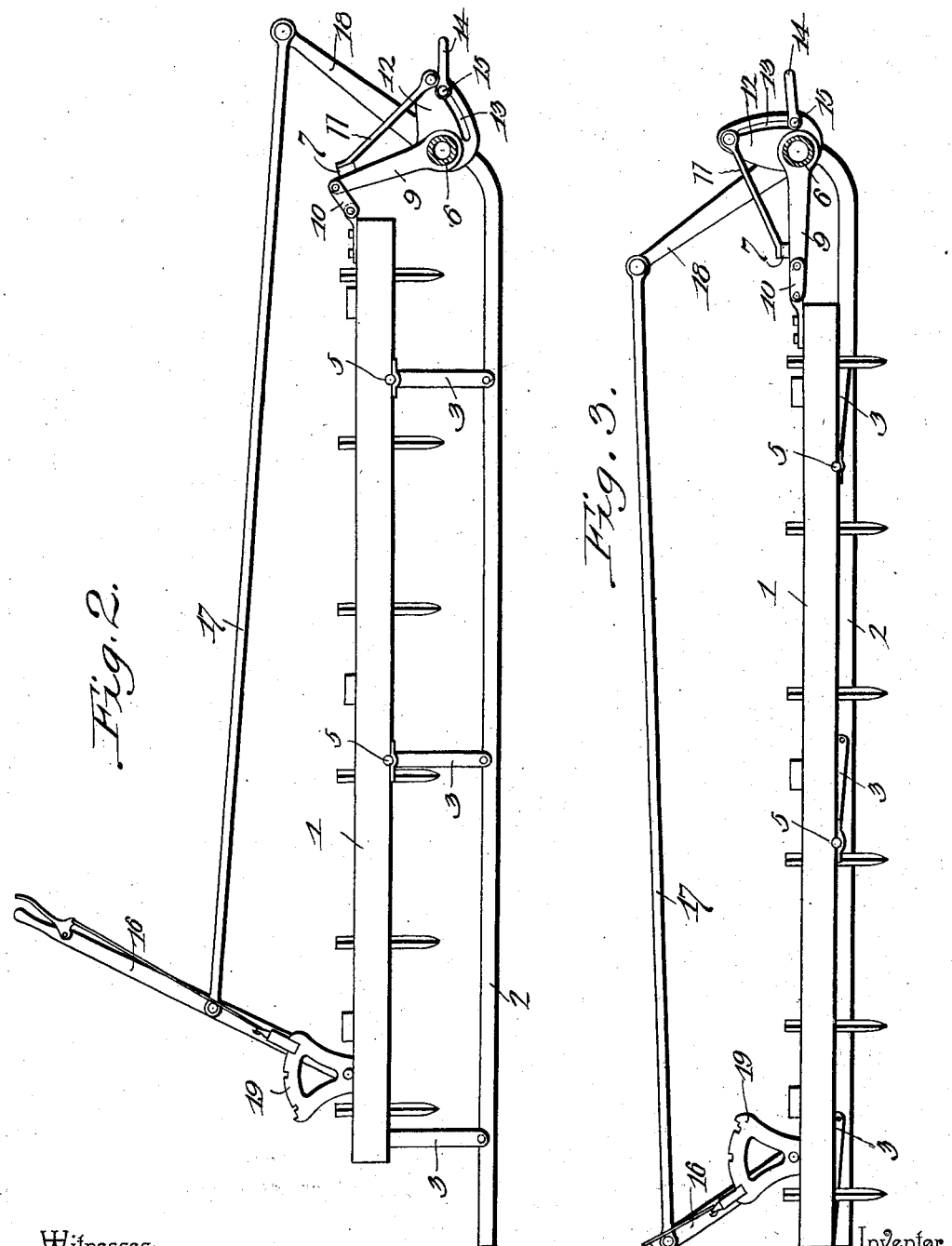

UNITED STATES PATENT OFFICE.

ARTHUR DIXON, OF ROLLA, NORTH DAKOTA.

SELF-CLEANING HARROW.

SPECIFICATION forming part of Letters Patent No. 749,923, dated January 19, 1904.

Application filed January 30, 1903. Serial No. 141,193. (No model.)

*To all whom it may concern:*

Be it known that I, ARTHUR DIXON, a citizen of the United States, residing at Rolla, in the county of Rolette and State of North Dakota, have invented a new and useful Self-Cleaning Harrow, of which the following is a specification.

My invention relates to self-cleaning harrows, particularly to that type of harrow in which the cleaning is effected by lifting the tooth-carrying frame upward until the teeth are some distance above the ground and simultaneously stripping the accumulated weeds and other trash from the teeth by the downward movement of the lifting members.

The objects contemplated in my invention are to produce a self-cleaning harrow of the type specified in which the lifting of the tooth-carrying frame is accomplished by the forward pull of the animals used to draw the harrow over the ground; to make it possible to clean all the sections of a harrow composed of a plurality of sections at a single operation; to make the cleaning mechanism in such form that it may be readily applied to ordinary harrows at small expense and with little modification of the harrow structure.

With these and other objects in view, which will appear as the invention is more fully disclosed, the invention consists in the construction and combination of parts hereinafter described, and shown in the accompanying drawings, in which—

Figure 1 is a plan view of a harrow constructed according to my invention. Fig. 2 is a side elevation showing the harrow lifted from the ground for cleaning. Fig. 3 is a side elevation of the harrow in operative position. Fig. 4 is a detail view of the lifter-plate.

In all the above-mentioned figures corresponding parts are indicated by the same characters of reference throughout.

Referring to the drawings by reference characters, 1 1 1 indicate frame-sections of a harrow constructed after my invention. These sections, as will be noted, are of the ordinary form common in harrows of this type.

2 2 2 represent lifter-bars having their forward ends upturned, so that they may be used as runners, as will be afterward explained, and secured to the harrow-frames by means of links 3 3 3. The links 3 3 3 are pivotally connected to the lifter-bars 2 2 2 and to especially-applied bars 5 5 5, secured to the sections 1 1 1 of the harrow. By means of the links 3 3 3 the lifter-bars are made susceptible of a movement downward from the tooth-carrying frames 1 1 1 and a movement backward when thrown downward by means of said links 3 3; but any lateral movement of the lifter-bars with reference to the frame-sections of the harrow is prevented. The operating means for the lifter-bars comprises a draw-bar 6, which extends across the front of the harrow and to which all of the lifter-bars and frame-sections of the harrow are secured in the manner hereinafter to be explained. When the harrow consists of only one or two sections, the lifter-bar may be formed of a single piece of piping of suitable diameter, this being light in weight and of sufficient strength to resist the strain of flexion produced by two or three sections of harrow. When a considerable number of sections—say five or more—are employed, I find it desirable to construct the lifter-bar of a sort of truss-frame structure, consisting of a piece of piping 6 and a supplementary bar or piece of piping of smaller diameter 7, which is connected with the bar 6 by means of obliquely-placed brace-rods 8 8 8 and is rigidly secured to arms 9, whose function will be presently explained.

The draw-bar is connected with the harrow-frame sections by means of arms 9, rigidly secured to the draw-bar and having links 10 between them and the harrow-sections in order to afford a certain amount of play in a vertical direction. By means of the links 3 3 3, the lifter-bars 2 2, and frames 1 1 and the connections just described between the draw-bar and the harrow-frame sections a comparatively slight rocking movement of the draw-bar will cause the downward movement of the lifter-bars, and consequent elevation of the harrow-frame sections, until the teeth are several inches above the ground. This downward movement of the lifter-bars serves not only to lift the harrow-teeth out of engagement with the ground, but also strips from the teeth any accumulated trash which may be matted thereon and deposits it in one place, where it may afterward be burned or gathered up for removal. The rocking motion of the draw-bar necessary to lift the harrow-frames and strip the trash from the teeth is brought about by means of one or more plates 12, rigidly secured to the draw-bar and braced by rods 11. The plates 12 are provided with cam-slots 13, in each of which slots is mounted a clevis or other suitable draft device 14, provided with a roller 15, so that free movement in the slot 13 may be obtained. It will be observed that when the plate 12 is in the position shown in Fig. 3 the roller 15 is at the lower end of the cam-slot, and a forward pull upon the clevis would tend to keep the plate 12 in that position, but that a pull forward and slightly upward would tend to throw the plate downward, owing to the travel of the roll 15 in the slot 13, so forcing the arms 9 forward and the arms 11 downward and lifting the harrow from the ground.

Rigidly secured to the draw-bar 6 is an arm 18, connected by a link 17 with a lever 16, mounted on the middle section of the harrow and movable along a curved rack of common form, (shown at 19.) By means of the lever 16, the link 17, and the arm 18, which is, as above stated, rigidly secured to the draw-bar 6, the draw-bar may be held against any rocking due to the forward pull of the draft-animals upon the clevis 14, or by releasing the lever 16 from the notches in the rack 19 it may be allowed to go forward and the draw-bar 6 be allowed to rock in response to the pull of the draft-animals. Thus it will appear that the driver who stands at the rear of the harrow is always able, by means of the arm 16 and associated mechanism, to cause the harrow-frames to be lifted by the pull of the draft-animals and to deposit the accumulated trash on the teeth of the harrows at any point and at any time desired without stopping the harrow. The upturned ends of the lifter-bars 2 2 cause the said bars to serve very well as runners for supporting the harrow as it is drawn forward during the lifting operation, and they also afford convenient means for transporting the harrow from field to field without danger of injuring the teeth by accidental contact with rocks or other obstructions.

To return the harrow-frames to their position in contact with the ground, it is only necessary to give a backward pull upon the lever 16 when the harrow is stationary. This tilts the links 3 3 slightly backward, and the weight of the harrow at once causes it to fall until the teeth have sunk to a slight distance into the ground. To then complete the operation of putting the parts of the harrow in position to continue the harrowing process, the lever 16 must be pulled backward far enough to lift the lifter-bars into contact with the frames of the harrow-sections. This lifting is of course accomplished by means of the rocking draw-bar 6 and its connections with the harrow-frames and the lifter-bars. When the lever 16 has reached the limit of its backward throw, it may be brought into engagement with a notch provided in the curved rack 19, and the lifter-bars will then be secured in raised position until it is desired to lift the harrow again and clean the teeth.

It is thought that the operation of my improved self-cleaning harrow will have been grasped from the foregoing description and accompanying explanation of the operation of the various parts of the mechanism, and a further and more detailed description is unnecessary. It is proper, however, at this point to call attention to certain advantages inherent in the construction above described which have not already been pointed out.

By means of the single rocking draw-bar and single controlling-lever therefor the driver is enabled to clean all of the sections of the harrow simultaneously and with practically no exertion on his part, as after the lever 16 is released from the engagement with a notch in the rear portion of the rack 19 the pull of the draft-animals will cause the clevis 14 to move upward and forward along the cam-slot 13 and rock the draw-bar sufficiently to effect the lifting and cleaning of all of the harrow-sections. Similarly after the completion of the cleaning operation all of the harrow-sections may be simultaneously brought again into operative position and the lifter-bars raised until they come into contact with the harrow-frame by a single rearward movement of the lever 16, it of course being understood that the harrow should be stationary during this operation. By means of the truss construction of the draw-bar I secure great lightness, together with sufficient strength to permit of the attachment of five or more harrow-sections to the draw-bar side by side, without producing any appreciable degree of flexion in the draw-bar when the harrow is in use.

Having now fully described the construction and operation of my improved self-cleaning harrow and pointed out the advantages resulting from the use of harrows constructed after my invention, what I claim as new, and desire to secure by Letters Patent, is—

1. The combination with a harrow, of means for positively cleaning the harrow-teeth operated solely by the forward pull of the draft-animals when the harrow is in use.

2. The combination with a harrow, of means for lifting the harrow bodily operated solely by the forward pull of the draft-animals when the harrow is in use.

3. The combination with a harrow, of means for simultaneously lifting the harrow from the ground and positively cleaning the harrow-teeth, said lifting and cleaning means being operated solely by the forward pull of the draft-animals when the harrow is in use.

4. The combination with a harrow, of means for lifting the harrow bodily and cleaning the teeth thereof, said means for lifting and cleaning being operated solely by the forward pull of the draft-animals when the harrow is in use and being controlled by the driver.

5. The combination with a harrow, of lifting means therefor, a rocking draw-bar connected with said harrow, and connections between said draw-bar and lifting means whereby the rocking of the draw-bar will operate the lifting means.

6. The combination with a harrow, of lifting-bars beneath the harrow-frame, a rocking draw-bar, connections between said draw-bar and harrow, and connections between said draw-bar and lifter-bars whereby the rocking of the draw-bar will lower the lifter-bars and raise the harrow.

7. The combination with a harrow, of means for lifting the harrow bodily adapted to be operated solely by a forward pull of the draft-animals, and means operated by the driver for controlling the operation of the lifting means.

8. The combination with a harrow, of lifting means, a rocking draw-bar connected with said harrow, connections between the draw-bar and lifting means whereby rocking the draw-bar will lift the harrow, a draft device, connections between said draft device and draw-bar, whereby a forward pull on the draft device will rock the draw-bar.

9. The combination with a harrow, of lifter-bars, link connections between said lifter-bars and harrow, a rocking draw-bar, connections between the draw-bar and harrow and between the draw-bar and lifter-bars, said connections comprising levers, a draft device, connections between the draw-bar and draft device whereby a forward pull on the draft device will rock the draw-bar.

10. The combination with a harrow, of lifting means, a rocking draw-bar, connections between the draw-bar and lifting means and between the draw-bar and harrow, a plate rigidly secured to the draw-bar and provided with a cam-slot, a draft device movably mounted in said cam-slot, whereby a forward pull on said draft device will rock the draw-bar.

11. The combination with a harrow, of lifting means, a rocking draw-bar, connections between the draw-bar and the harrow and between the draw-bar and lifting means, whereby rocking the draw-bar will operate the lifting means, a draft device, connections between said draft device and draw-bar, whereby a forward pull on the draft device will rock the draw-bar, and means controlled by the driver for holding the draw-bar against rocking.

12. The combination of harrow-sections, lifting means for each section, a single draw-bar for all sections, connections between the draw-bar and the harrow-section, and between the draw-bar and lifting means, whereby rocking the draw-bar will simultaneously lift all the harrow-sections.

13. The combination of a plurality of harrow-sections, combined means for lifting and cleaning each section, a single draw-bar for all the sections, connections between the draw-bar and the harrow-sections and between the draw-bar and the combined lifting and cleaning means, whereby rocking the draw-bar will lift and clean all the sections simultaneously.

14. The combination of a plurality of harrow-sections, combined lifting and cleaning means for each section, a single draw-bar for all the sections, connections between the draw-bar and the harrow-sections and between the draw-bar and the combined lifting and cleaning means, whereby rocking the draw-bar will lift and clean all of the sections simultaneously, and a single means operated by the driver for controlling the rocking of the draw-bar.

15. The combination of a plurality of harrow-sections arranged side by side, a single draw-bar of truss-frame construction connected with all the harrow-sections extending transversely of the direction of movement of said sections, lifting means for each of the harrow-sections, and connections between the lifting means and the draw-bar, whereby rocking the draw-bar will operate all of the lifting means simultaneously.

In testimony that I claim the foregoing as my own I have hereto affixed my signature in the presence of two witnesses.

ARTHUR DIXON.

Witnesses:
CHAS. JAS. PARTRIDGE,
ALFRED MATHEWS.